United States Patent
Osumi et al.

(10) Patent No.: US 11,274,199 B2
(45) Date of Patent: Mar. 15, 2022

(54) PERFLUOROELASTOMER COMPOSITION AND SEALING MATERIAL

(71) Applicant: VALQUA, LTD., Tokyo (JP)

(72) Inventors: Naoki Osumi, Gojo (JP); Tomomitsu Mochizuki, Gojo (JP); Kana Hirai, Gojo (JP); Masamune Noguchi, Gojo (JP)

(73) Assignee: VALQUA, LTD., Tokyo (JP)

( * ) Notice: Subject to any disclaimer, the term of this patent is extended or adjusted under 35 U.S.C. 154(b) by 28 days.

(21) Appl. No.: 16/313,277

(22) PCT Filed: Jul. 11, 2017

(86) PCT No.: PCT/JP2017/025269
§ 371 (c)(1),
(2) Date: Dec. 26, 2018

(87) PCT Pub. No.: WO2018/012496
PCT Pub. Date: Jan. 18, 2018

(65) Prior Publication Data
US 2019/0161606 A1    May 30, 2019

(30) Foreign Application Priority Data
Jul. 13, 2016 (JP) .............................. JP2016-138402

(51) Int. Cl.
*C08L 27/12* (2006.01)
*C08K 3/04* (2006.01)
*C09K 3/10* (2006.01)
*C08K 5/3445* (2006.01)
*C08K 5/3492* (2006.01)
*C08K 5/353* (2006.01)

(52) U.S. Cl.
CPC .............. *C08L 27/12* (2013.01); *C08K 3/04* (2013.01); *C08K 5/3445* (2013.01); *C08K 5/3492* (2013.01); *C08K 5/353* (2013.01); *C09K 3/1009* (2013.01); *C08K 2201/001* (2013.01); *C09K 2003/1068* (2013.01); *C09K 2200/0208* (2013.01)

(58) Field of Classification Search
CPC .... C08K 5/3445; C08K 5/3492; C08K 5/353; C08K 3/04; C08K 2201/001; C08K 5/0025; C08L 27/12; C09K 3/1009; C09K 3/04; C09K 2200/0208; C09K 2003/1068
See application file for complete search history.

(56) References Cited

U.S. PATENT DOCUMENTS

| 5,877,264 A * | 3/1999 | Logothetis et al. ........................ C08F 214/262 526/229 |
| 6,114,065 A | 9/2000 | Inoue et al. |
| 2002/0026014 A1* | 2/2002 | Bish ........................ C08L 27/18 525/375 |
| 2002/0034685 A1* | 3/2002 | Sato et al. ............ H01M 10/05 429/176 |
| 2004/0171714 A1 | 9/2004 | Kuzawa et al. |
| 2006/0235140 A1 | 10/2006 | Tanaka et al. |
| 2010/0093898 A1 | 4/2010 | Campbell et al. |
| 2010/0216933 A1 | 8/2010 | Wang |
| 2011/0086229 A1* | 4/2011 | Noguchi .................. C08L 27/18 428/421 |
| 2012/0077935 A1* | 3/2012 | Gurevich .................. C08K 5/18 525/200 |
| 2012/0100379 A1* | 4/2012 | Luo et al. ................ C08J 5/125 428/421 |
| 2017/0229693 A1* | 8/2017 | Abe et al. ......... H01M 10/0569 |
| 2018/0105687 A1* | 4/2018 | Ito et al. ................. C08L 23/06 |
| 2018/0159114 A1* | 6/2018 | Tanihari et al. .. H01M 10/0525 |

FOREIGN PATENT DOCUMENTS

| JP | 8-151450 A | 6/1996 |
| JP | 10-4033 A | 1/1998 |
| JP | 10-312811 A | 11/1998 |
| JP | 2004-263038 A | 9/2004 |
| JP | 2010-37558 A | 2/2010 |
| JP | 2012-519221 A | 8/2012 |
| JP | 2012-236916 A | 12/2012 |
| JP | 2015-98609 A | 5/2015 |
| WO | 2004/094527 A1 | 11/2004 |
| WO | 2009/072606 A1 | 6/2009 |
| WO | 2012/153701 A1 | 11/2012 |

OTHER PUBLICATIONS

Ketjenblack Highly Electroconductive Carbon Black | Lions Specialty Chemicals Co., Ltd. Trade sheet (Year: 1996).*
Lion Specialty Chemicals Co., Ltd., Ketjenblack Highly Electro-Conductive Carbon Black, Copyright © 1996-2017.*
International Search Report dated Aug. 22, 2017, issued in counterpart application No. PCT/JP2017/025269 (2 pages).
(Continued)

*Primary Examiner* — Irina S Zemel
(74) *Attorney, Agent, or Firm* — Westerman, Hattori, Daniels & Adrian, LLP

(57) ABSTRACT

Provided are a perfluoroelastomer composition which contains 100 parts by weight of a perfluoroelastomer containing a constituent unit derived from a nitrile group-containing monomer, and 0.01 to 5 parts by weight of ketjen black; and a sealing material including a crosslinked product of the perfluoroelastomer composition.

2 Claims, No Drawings

(56) References Cited

OTHER PUBLICATIONS

Office Acation dated Nov. 24, 2020, issued in counterpart KR Application No. 10-2019-7003572, w/English Translation. (6 pages).
Office Action dated Jan. 12, 2021, issued in counterpart JP application No. 2017-135353 with English translation. (12 pages).
Office Action dated Jun. 22, 2021, issued in counterpart JP Application No. 2017-135353, with English Translation. (11 pages).
Mineki, Minoru, "Blending Design and Blending Agent", Journal of the Society of Rubber Science and Technology, Japan, 1973, 1973, vol. 46, No. 7, pp. 534 to 566; Cited in JP Office Action dated Jun. 22, 2021. (33 pages).

\* cited by examiner

US 11,274,199 B2

PERFLUOROELASTOMER COMPOSITION AND SEALING MATERIAL

TECHNICAL FIELD

The present invention relates to a perfluoroelastomer composition and a sealing material containing the same.

BACKGROUND ART

Sealing materials (gasket, packing, etc.) are used for various applications, and are required to have characteristics depending on the applications. When sealing materials are used under a high temperature environment, for example, heat resistance is required. In a film-forming step in the production of a semiconductor device and a flat panel display, there is a case where ozone having a strong oxidation power is used. A sealing material used in a production device that uses ozone is required to have resistance to ozone (ozone resistance). In addition, when a sealing material is used under an environment exposed to plasma, it is required to have resistance to plasma (plasma resistance).

In the production of a semiconductor device including a chemical vapor deposition (CVD) device, cleaning with plasma may be carried out to remove unnecessary deposits generated in a process chamber during film formation. In particular, a method for cleaning by introducing fluorine radicals generated by $NF_3$ remote plasma into a process chamber has been widely used because of excellent cleaning efficiency.

Japanese Patent Laying-Open No. H08-151450 (Patent Literature 1), Japanese Patent Laying-Open No. 2004-263038 (Patent Literature 2) and Japanese Patent Laying-Open No. 2010-037558 (Patent Literature 3) focus on the ozone resistance of a sealing material. Japanese Patent Laying-Open No. 2015-098609 (Patent Literature 4) and WO 2004/094527 (Patent Literature 5) focus on the plasma resistance of a sealing material.

CITATION LIST

Patent Literature

PTL 1: Japanese Patent Laying-Open No. H08-151450
PTL 2: Japanese Patent Laying-Open No. 2004-263038
PTL 3: Japanese Patent Laying-Open No. 2010-037558
PTL 4: Japanese Patent Laying-Open No. 2015-098609
PTL 5: WO 2004/094527

SUMMARY OF INVENTION

Technical Problems

Techniques described in Patent Literatures 1 to 3 have had room for improvement at least in the following respects.

(1) Patent Literature 1: ozone resistance under a high temperature environment is insufficient. In addition, a filler such as an inorganic filler is preferably blended in a fluoro rubber molded body described in Patent Literature 1 from the viewpoint of favorably keeping ozone resistance and also reducing the amount of rubber to be blended; however, the inorganic filler can be a factor to contaminate a device to which a sealing material is applied and a product manufactured by including the device. That is, even when a sealing material having excellent ozone resistance is used, an elastomer component for the sealing material may be etched by ozone under a severe ozone environment, and in this case, there is a risk that the blended inorganic filler is scattered in the above device.

(2) Patent Literature 2: Patent Literature 2 discloses a fluoro rubber molded body including a tetrafluoroethylene-propylene copolymer; however, ozone resistance is inferior to that of a perfluoroelastomer because the tetrafluoroethylene-propylene copolymer includes a C—H bond in the polymer skeleton.

(3) Patent Literature 3: Patent Literature 3 discloses a fluorine-containing elastomer composition containing a specific crosslinking agent; however, the crosslinking agent is generally difficult to be available.

In addition, resistance to fluorine radicals in a case where a sealing material is used under a high temperature environment and further resistance to a high concentration of fluorine radicals are not considered in the inventions described in Patent Literatures 4 and 5.

An object of the present invention is to provide a perfluoroelastomer composition that can be prepared using raw materials generally available and can form a crosslinked product exhibiting excellent resistance to high concentrations of ozone and fluorine radicals even under a high temperature environment, and a sealing material including the same.

Solutions to Problems

The present invention provides a perfluoroelastomer composition and a sealing material described below.

[1] A perfluoroelastomer composition, comprising 100 parts by weight of a perfluoroelastomer containing a constituent unit derived from a nitrile group-containing monomer, and 0.01 to 5 parts by weight of ketjen black.

[2] The perfluoroelastomer composition according to [1], wherein a content of the ketjen black is less than or equal to 3 parts by weight with respect to 100 parts by weight of the perfluoroelastomer.

[3] The perfluoroelastomer composition according to [1] or [2], wherein a crosslinking system of the perfluoroelastomer is a triazine crosslinking system, an oxazole crosslinking system or an imidazole crosslinking system.

[4] A sealing material, comprising a crosslinked product of the perfluoroelastomer composition according to any of [1] to [3].

Advantageous Effects of Invention

The present invention can provide a perfluoroelastomer composition that can be prepared using raw materials generally available and can form a crosslinked product exhibiting excellent resistance to high concentrations of ozone and fluorine radicals even under a high temperature environment, and a sealing material including the same.

DESCRIPTION OF EMBODIMENTS

<Perfluoroelastomer Composition>

[A] Perfluoroelastomer

A perfluoroelastomer used in the present invention contains a constituent unit derived from a nitrile group-containing monomer. The nitrile group-containing monomer is a crosslinking site monomer (a monomer having a site at which crosslinking reaction can occur). That is, the perfluoroelastomer containing a constituent unit derived from a nitrile group-containing monomer is a crosslinking perfluoroelastomer that can be crosslinked at a nitrile group as a crosslinking point.

The perfluoroelastomer can be, for example, a tetrafluoroethylene (TFE)-perfluoro(alkyl vinyl ether) copolymer and a TFE-perfluoro(alkoxyalkyl vinyl ether) copolymer that contain a constituent unit derived from a nitrile group-containing monomer. These copolymers may further contain a constituent unit derived from other perfluoromonomers. A perfluoroelastomer composition containing the perfluoroelastomer can be further enhanced in ozone resistance and fluorine radical resistance as compared to those of a composition containing a hydrogen atom-containing fluoroelastomer. The perfluoroelastomer composition may contain only one perfluoroelastomer or two or more perfluoroelastomers.

A perfluoro(alkyl vinyl ether) forming the tetrafluoroethylene (TFE)-perfluoro(alkyl vinyl ether) copolymer can have 1 to 5 carbon atoms in the alkyl group, and can be a perfluoro(methyl vinyl ether), perfluoro(ethyl vinyl ether), perfluoro(propyl vinyl ether), or the like.

A perfluoro(alkoxyalkyl vinyl ether) forming the TFE-perfluoro(alkoxyalkyl vinyl ether) copolymer can have 3 to 12 carbon atoms in a group bound to a vinyl ether group ($CF_2=CFO-$), and can be, for example,

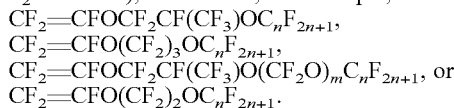

$CF_2=CFO(CF_2)_2OC_nF_{2n+1}$.

In the above formulae, n is for example 1 to 5, and m is for example 1 to 3.

An example of the nitrile group-containing monomer is a nitrile group-containing perfluorovinyl ether. Examples of the nitrile group-containing perfluorovinyl ether can include $CF_2=CFO(CF_2)_nOCF(CF_3)CN$ (n is for example 2 to 4),
$CF_2=CFO(CF_2)_nCN$ (n is for example 2 to 12),

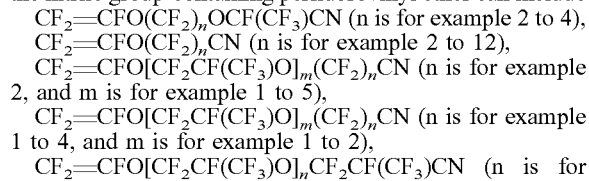

$CF_2=CFO[CF_2CF(CF_3)O]_m(CF_2)_nCN$ (n is for example 1 to 4, and m is for example 1 to 2),
$CF_2=CFO[CF_2CF(CF_3)O]_nCF_2CF(CF_3)CN$ (n is for example 0 to 4), and the like.

The molar ratio of TFE-derived constituent unit/perfluoro (alkyl vinyl ether) or perfluoro(alkoxyalkyl vinyl ether)-derived constituent unit/crosslinking site monomer-derived constituent unit in the perfluoroelastomer is commonly 50 to 74.8%/25 to 49.8%/0.2 to 5%, and preferably 60 to 74.8%/25 to 39.5%/0.5-2%. The perfluoroelastomer composition of the present invention can also contain 2 or more perfluoroelastomers having different ratios of the above constituent units.

[b] Ketjen Black

The perfluoroelastomer composition contains 0.01 to 5 parts by weight of ketjen black per 100 parts by weight of the perfluoroelastomer. The perfluoroelastomer composition of the present invention containing the ketjen black in the above content can form a crosslinked product exhibiting excellent resistance to high concentrations of ozone and fluorine radicals even under a high temperature environment. In addition, the perfluoroelastomer composition of the present invention containing the ketjen black in the above content can impart favorable rubber elasticity to a crosslinked product obtained by crosslinking the perfluoroelastomer composition, and can form a crosslinked product with excellent heat resistance.

The content of the ketjen black is preferably greater than or equal to 0.05 parts by weight from the viewpoint of ozone resistance and fluorine radical resistance under a high temperature environment. The content of the ketjen black may be less than or equal to 4 parts by weight, less than or equal to 3 parts by weight and less than 3 parts by weight per 100 parts by weight of the perfluoroelastomer.

When the content of the ketjen black is less than 0.01 parts by weight per 100 parts by weight of the perfluoroelastomer, it is difficult to obtain both ozone resistance and fluorine radical resistance under a high temperature environment. When the content of the ketjen black is above 5 parts by weight per 100 parts by weight of the perfluoroelastomer, it is difficult to form a crosslinked product exhibiting excellent resistance to both high concentrations of ozone and fluorine radicals, and there is also a risk that the hardness of the crosslinked product excessively increases to lose rubber elasticity.

In addition, when the content of the ketjen black is above 5 parts by weight per 100 parts by weight of the perfluoroelastomer, easiness in kneading of components blended when the perfluoroelastomer composition is prepared may decrease. Furthermore, when the content of the ketjen black is above 5 parts by weight per 100 parts by weight of the perfluoroelastomer, a problem of scattering of the ketjen black under a severe ozone environment or fluorine radical environment can be revealed.

Furthermore, when the content of the ketjen black is above 5 parts by weight per 100 parts by weight of the perfluoroelastomer, crosslinking time (molding time) when the crosslinked product is produced from the perfluoroelastomer composition may be prolonged, and variations of the degree of crosslinking in the crosslinked product to be obtained may be large.

Still furthermore, when the content of the ketjen black is above 5 parts by weight per 100 parts by weight of the perfluoroelastomer, there is a tendency that a crosslinked product having excellent properties is not easily obtained due to decrease in moldability.

[c] Crosslinking Agents, Other Crosslinking Aids

The perfluoroelastomer composition can contain a crosslinking agent depending on a crosslinking system of the perfluoroelastomer containing a constituent unit derived from a nitrile group-containing monomer, and other crosslinking aids. The crosslinking system of the perfluoroelastomer can be, for example, a triazine crosslinking system, an oxazole crosslinking system, an imidazole crosslinking system or a thiazole crosslinking system. The crosslinking agents may be used individually or two or more of the crosslinking agents may be used in combination.

Among the above, the crosslinking system of the perfluoroelastomer is preferably a triazine crosslinking system, an oxazole crosslinking system or an imidazole crosslinking system from the viewpoint of forming a crosslinked product exhibiting excellent resistance to high concentrations of ozone and fluorine radicals even under a high temperature environment.

In the triazine crosslinking system, crosslinking catalysts such as an organotin compound, onium salts such as a quaternary phosphonium salt and a quaternary ammonium salt, urea and silicon nitride are used.

Examples of crosslinking agents used in the oxazole crosslinking system include 2,2-bis(3-amino-4-hydroxyphenyl)hexafluoropropane (BOAP), 4,4'-sulfonylbis(2-aminophenol), and 9,9-bis(3-amino-4-hydroxyphenyl)fluorene. Preferably, BOAP is used.

As crosslinking agents used in the imidazole crosslinking system and the thiazole cross-linking system, conventionally known crosslinking agents can be used. As crosslinking agents used in the imidazole crosslinking system, 3,3',4,4'-tetraaminobenzophenone, 3,3'-diaminobenzidine and the like can be given.

The content of the crosslinking agent or crosslinking catalyst in the perfluoroelastomer composition (in a case where two or more of the crosslinking agents or crosslinking catalysts are used, the sum total amount thereof) is for example 0.01 to 20 parts by weight per 100 parts by weight of the perfluoroelastomer, and is preferably less than or equal to 10 parts by weight and more preferably less than or equal to 5 parts by weight from the viewpoint of improving ozone resistance, fluorine radical resistance and/or heat resistance (compression set characteristics) under a high temperature environment.

[d] Other Blending Agents

The perfluoroelastomer composition can contain additives such as an age resister, an antioxidant, a vulcanizing accelerator, a processing aid (e.g., stearic acid), a stabilizer, a tackifier, a silane coupling agent, a plasticizer, a flame retardant, a release agent, waxes and a lubricant as needed for the purpose of, for example, improving workability and adjusting physical properties. Another example of the additives is an adhesion reducing agent (antitack agent) such as a fluorine-based oil (e.g., perfluoroether, etc.) The additives may be used individually or two or more of the additives may be used in combination.

However, for example when a sealing material is used under a high temperature environment, there is a risk that volatilization, elution or precipitation occurs. Accordingly, the amount of the additive is preferably as small as possible (for example, less than or equal to 10 parts by weight, preferably less than or equal to 5 parts by weight, more preferably less than or equal to 2 parts by weight, and further preferably less than or equal to 1 part by weight per 100 parts by weight of the perfluoroelastomer). It is desirable that the additive is not contained.

In addition, the perfluoroelastomer composition can contain an inorganic filler such as silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, metallic powder, glass powder, and ceramic powder as needed.

However, when the content of the inorganic filler is large, there is a risk to reveal a problem of scattering the inorganic filler under a severe ozone environment or fluorine radical environment. Accordingly, the amount of the inorganic filler is preferably as small as possible (for example, less than or equal to 10 parts by weight, preferably less than or equal to 5 parts by weight, more preferably less than or equal to 2 parts by weight, and further preferably less than or equal to 1 part by weight per 100 parts by weight of the perfluoroelastomer). It is desirable that the inorganic filler is not compounded. It should be noted that the inorganic filler indicates a filler containing a metallic element (Ba, Ti, Zn, Al, Mg, Ca, Si, etc.)

The perfluoroelastomer composition can further contain a fluororesin. The form of the fluororesin is not particularly restricted, and, the fluororesin can be contained in the perfluoroelastomer composition, for example, as fluororesin particles.

The fluororesin is a resin having a fluorine atom in a molecule, and can be, for example, polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF), polyvinyl fluoride (PVF), vinylidene fluoride-hexafluoropropylene copolymer (VDF-HFP copolymer), vinylidene fluoride-hexafluoropropylene-tetrafluoroethylene copolymer (VDF-HFP-TFE copolymer), or the like. The fluororesins may be used individually or two or more of the fluororesins may be used in combination.

Among the above, it is preferred to use fluororesins such as PFA and PTFE that have a relatively high melting point, from the viewpoint of preventing the loss of characteristics such as compression set due to melting of the resin under a high temperature environment.

The fluororesin may contain a functional group. The functional group can be introduced, for example, by copolymerizing a monomer having the functional group. When a crosslinking site monomer having a crosslinking site such as a nitrile group is copolymerized as a monomer having a functional group, crosslinking of the fluororesin and the perfluoroelastomer also proceeds due to the above crosslinking catalyst and the crosslinking agent, so that the mechanical strength and the like of the crosslinked product of the perfluoroelastomer composition can be further enhanced. As an example of the fluororesin containing a functional group, a nitrile group-containing polytetrafluoroethylene described in Japanese Patent Laying-Open No. 2013-177631 can be given.

In addition, the fluororesin can be a modified fluororesin such as "TFM modified PTFE" (manufactured by Dyneon).

When the fluororesin is used, the content of the fluororesin in the perfluoroelastomer composition (in a case where two or more of the fluororesins are used, the sum total amount thereof) is preferably 1 to 100 parts by weight and more preferably 5 to 50 parts by weight per 100 parts by weight of the perfluoroelastomer, from the viewpoint of effectively enhancing the mechanical strength and the like of the crosslinked product. When the content of the fluororesin is excessively large, the content of the perfluoroelastomer that exhibits elasticity relatively decreases, and thus compression set characteristics can be deteriorated.

[e] Preparation of Perfluoroelastomer Composition

The perfluoroelastomer composition can be prepared by uniformly kneading the perfluoroelastomer, the ketjen black, the crosslinking agent or crosslinking catalyst, and the other blending agents added as needed. As a kneader, for example, conventionally known kneaders such as a mixing roll including an open roll; and a mixer including a kneader or a Bunbury mixer can be used. These components may be mixed and kneaded at a time, or all components may be kneaded in several steps, for example, by kneading a portion of the components, followed by kneading the rest of the components.

In view of the kneading of the perfluoroelastomer and the fluororesin, for example, 1) a method in which perfluoroelastomer powder and fluororesin powder are kneaded using a mixing roll, 2) a method in which perfluoroelastomer powder or pellets and fluororesin powder or pellets are melt-kneaded using a device such as a mixer or a twin screw extruder, and moreover 3) a method in which the fluororesin is added in the step of preparing the perfluoroelastomer can be used.

As the method of 3) above, a method in which an aqueous dispersion liquid of a perfluoroelastomer and an aqueous dispersion liquid of a fluororesin, both obtained by an emulsion polymerization method, are mixed, and a mixture of the perfluoroelastomer and the fluororesin is then obtained by co-coagulation can be given.

<Sealing Material>

A crosslinked molded product such as a sealing material can be obtained by crosslinking and molding (vulcanizing and molding) the above perfluoroelastomer composition. That is, the sealing material includes a crosslinked product of the perfluoroelastomer composition. The crosslinking and molding can be carried out by subjecting the perfluoroelastomer composition to pre-molding as needed and then subjecting the resulting material to press molding using a die. The molding temperature is for example about 150 to 220° C. The molding may be carried out by feed press molding, injection molding, extrusion molding or the like. Secondary crosslinking may be carried out at a temperature of about 150 to 320° C. as needed.

After the crosslinking and molding (e.g., press molding) as described above, the step of performing crosslinking by irradiation of ionizing radiation may be further carried out. This can further improve compression set characteristics. As the ionizing radiation, electron beams and γ rays can be preferably used.

The sealing material can be a packing, a gasket or the like. The shape of the sealing material is appropriately selected depending on its applications, and its typical example is an O-ring having a cross-sectional shape of an O-shape. The sealing material of the present invention exhibits excellent ozone resistance and fluorine radical resistance even under a high temperature environment, and thus can be favorably used as a sealing material for retaining a vacuum degree inside a device that uses ozone under a high temperature environment or a device that performs cleaning by $NF_3$ remote plasma under a high temperature environment, such as a semiconductor device and a CVD device that is used in the film-forming step in the production of a flat panel display.

EXAMPLES

The present invention will be described in more detail below by way of Examples and Comparative Examples. It should be noted, however, that the present invention is not limited thereto.

Examples 1 to 6 and Comparative Examples 1 to 3

Perfluoroelastomer compositions were prepared in accordance with the following procedure, and sealing materials were then produced. First, in accordance with the blending composition shown in Table 1 (the unit of the blending amount is part(s) by weight in Table 1), the respective blending agents were kneaded in predetermined amounts by an open roll. Next, each of the obtained perfluoroelastomer compositions was press-molded in conditions described below, and then subjected to secondary crosslinking by heat in conditions described below to obtain a sealing material (O-ring).

Examples 1 to 5, Comparative Examples 1 and 3: press molding conditions 180° C.×20 minutes; secondary crosslinking conditions 250° C.×24 hours, Example 6, Comparative Example 2: press molding conditions 180° C.×25 minutes; secondary crosslinking conditions 250° C.×24 hours.

The details of each blending agent used in Examples and Comparative Examples described above are as follows.

[1] FFKM 1: a composition containing a perfluoroelastomer that is a tetrafluoroethylene-perfluoro(alkyl vinyl ether)-nitrile group-containing monomer copolymer and a fluororesin ["PFE 133TBZ" manufactured by 3M Company]. In Table 1, the content of the perfluoroelastomer (parts by weight) contained in FFKM 1 is shown in the column of "FFKM 1" and the content of the fluororesin (parts by weight) contained in FFKM 1 is shown in the column of "Fluororesin 1."

[2] FFKM 2: a perfluoroelastomer that is a tetrafluoroethylene-perfluoro(alkyl vinyl ether)-nitrile group-containing monomer copolymer ["PFE 191TZ" manufactured by 3M Company].

[3] FFKM 3: a composition containing a perfluoroelastomer that is a tetrafluoroethylene-perfluoro(alkyl vinyl ether)-nitrile group-containing monomer copolymer and a triazine catalyst ["PFE 01CZ" manufactured by 3M Company]. In Table 1, the content of the perfluoroelastomer (parts by weight) contained in FFKM 3 is shown in the column of "FFKM 3" and the content of the triazine catalyst (parts by weight) contained in FFKM 3 is shown in the column of "Triazine catalyst."

[4] Ketjen black: "KETJEN BLACK EC600JD" manufactured by LION SPECIALTY CHEMICALS CO., LTD.

[5] SEAST GSO: N-550 FEF carbon black "SEAST GSO" manufactured by TOKAI CARBON CO., LTD.

[6] BOAP: an oxazole crosslinking agent (chemical name: 2,2-bis(3-amino-4-hydroxyphenyl)hexafluoropropane) manufactured by Tokyo Chemical Industry Co., Ltd.

(Evaluation of Sealing Material)

The following items of the obtained crosslinked moldings (sealing materials) were measured and evaluated. The results are shown in Table 1.

[1] Evaluation of Ozone Resistance

An ozone exposure test was carried out by exposing each of the sealing materials to ozone under conditions described below. The weight of the sealing material before and after the test was measured, and the weight loss rate was calculated in accordance with the following formula:

Weight loss rate (%)={(weight before test−weight after test)/(weight before test)}×100. The weight loss rate is preferably less than 0.65%.

(Conditions of Ozone Exposure Test)
Ozone concentration: 200 $g/m^3$,
Test temperature: 170° C., and
Test time: 24 hours.

TABLE 1

|  |  | Example | | | | | Comparative Example | Example | Comparative Example | |
|---|---|---|---|---|---|---|---|---|---|---|
|  |  | 1 | 2 | 3 | 4 | 5 | 1 | 6 | 2 | 3 |
| Perfluoroelastomer | FFKM 1 (elastomer component) | 94 | 94 | 94 | 94 | 94 | 94 |  |  |  |
|  | FFKM 2 |  |  |  |  |  |  | 100 | 100 | 100 |
|  | FFKM 3 (elastomer component) | 6 | 6 | 6 | 6 | 6 | 6 |  |  |  |
| Fluororesin | Fluororesin 1 (derived from FFKM 1) | 24 | 24 | 24 | 24 | 24 | 24 |  |  |  |
|  | Ketjen black | 0.05 | 0.1 | 0.5 | 1 | 2.9 |  | 0.5 |  |  |
|  | SEAST GSO |  |  |  |  |  |  |  |  | 0.5 |
| Triazine catalyst |  | 2 | 2 | 2 | 2 | 2 | 2 |  |  |  |
|  | BOAP |  |  |  |  |  |  | 0.5 | 0.5 | 0.5 |
| Ozone resistance | Weight loss rate (%) | 0.52 | 0.51 | 0.43 | 0.43 | 0.53 | 0.68 | 0.58 | 0.68 | 0.62 |
|  | Changes in surface state | A | A | A | A | A | A | A | A | A |
| Fluorine radical resistance | Weight loss rate (%) | 0.31 | 0.35 | 0.34 | 0.23 | 0.12 | 0.47 | 0.09 | 0.20 | 0.24 |
|  | Changes in surface state | B | A | A | A | A | C | A | C | C |
|  | Moldability | A | A | A | A | A | A | A | A | A |

In addition, the appearance of the sealing material after the ozone exposure test was visually observed, and the appearance of the sealing material was evaluated in accordance with evaluation criteria described below.

A: melting and cracks are not caused on the surface of the sealing material.

B: melting or cracks are caused partly or to a small extent on the surface of the sealing material.

C: melting or cracks are caused entirely or to a great extent on the surface of the sealing material.

[2] Evaluation of Fluorine Radical Resistance

A fluorine radical exposure test was carried out by exposing each of the sealing materials to fluorine radicals generated by $NF_3$ remote plasma under conditions described below. The weight of the sealing material before and after the test was measured, and the weight loss rate was calculated in accordance with the following formula:

Weight loss rate (%)={(weight before test−weight after test)/(weight before test)}×100. The weight loss rate is preferably less than 0.5%.

(Conditions of Fluorine Radical Exposure Test)
Plasma source: remote plasma source,
Plasma output: 5000 W,
Gas flow: $NF_3$ 2 slm, Argon 2 slm,
Vacuum degree: 5 torr,
Test temperature: 260° C., and
Test time: 3 hours.

In addition, the appearance of the sealing material after the fluorine radical exposure test was visually observed, and the appearance of the sealing material was evaluated in accordance with the same evaluation criteria as for the ozone exposure test.

[3] Evaluation of Moldability

The obtained crosslinked moldings (sealing materials) were visually observed, and the moldability of each of the sealing materials was evaluated in accordance with evaluation criteria described below.

A: there are no roughness on a surface and deformation of O-ring shape.
B: roughness is partly observed on a surface.
C: roughness is entirely observed on a surface.
D: roughness is large on a surface and deformation of O-ring shape is observed.

Examples 7 to 9 and Comparative Examples 4 to 8

Perfluoroelastomer compositions were prepared in accordance with the following procedure, and sealing materials were then produced. First, in accordance with the blending composition shown in Table 2 (the unit of the blending amount is part(s) by weight in Table 2), the respective blending agents were kneaded in predetermined amounts by an open roll. Next, each of the obtained perfluoroelastomer compositions was press-molded in conditions described below, and then subjected to secondary crosslinking by heat in conditions described below to obtain a sealing material (O-ring). It should be noted that the perfluoroelastomer composition in Comparative Example 8 could not be press-molded.

Press molding conditions 180° C.×30 minutes; secondary crosslinking conditions 250° C.×24 hours.

The details of each blending agent used in Examples and Comparative Examples described above are as follows.

[1] FFKM 2: a perfluoroelastomer that is a tetrafluoroethylene-perfluoro(alkyl vinyl ether)-nitrile group-containing monomer copolymer ["PFE 191TZ" manufactured by 3M Company].

[2] FFKM 3: a composition containing a perfluoroelastomer that is a tetrafluoroethylene-perfluoro(alkyl vinyl ether)-nitrile group-containing monomer copolymer and a triazine catalyst ["PFE 01CZ" manufactured by 3M Company]. In Table 2, the content of the perfluoroelastomer (parts by weight) contained in FFKM 3 is shown in the column of "FFKM 3" and the content of the triazine catalyst (parts by weight) contained in FFKM 3 is shown in the column of "Triazine catalyst."

[3] Fluororesin 2: fluororesin powder "Lubron L-5" manufactured by Daikin Industries, Ltd.

[4] Ketjen black: "KETJEN BLACK EC600JD" manufactured by LION SPECIALTY CHEMICALS CO., LTD.

(Evaluation of Sealing Material)

The following items of the obtained crosslinked moldings (sealing materials) were measured and evaluated. The results are shown in Table 2.

[1] Evaluation of Ozone Resistance
Evaluation was made in the same manner as in Examples 1 to 6 and Comparative Examples 1 to 3.

[2] Evaluation of Fluorine Radical Resistance
Evaluation was made in the same manner as in Examples 1 to 6 and Comparative Examples 1 to 3.

[3] Evaluation of Moldability
Evaluation was made in the same manner as in Examples 1 to 6 and Comparative Examples 1 to 3.

[4] Evaluation of Crosslinking Characteristics of Perfluoroelastomer Composition Using a curelastometer (CURELASTOMETER TYPE 5 manufactured by JSR Trading Co., Ltd), crosslinking characteristics (vulcanization characteristics) were determined in accordance with JIS K6300-2:2001 (temperature 180° C., time 60 minutes). The obtained lowest torque value $M_L$ [kgf·cm], highest torque value $M_H$[kgf·cm], induction time tc(10) [min], 50% vulcanization time tc(50) [min], and 90% vulcanization time tc(90) [min] are shown in Table 2.

Examples 10 to 16 and Comparative Examples 9 to 14

Perfluoroelastomer compositions were prepared in accordance with the following procedure, and sealing materials

TABLE 2

|  |  | Comparative Example | Example | | | Comparative Example | | | |
|---|---|---|---|---|---|---|---|---|---|
|  |  | 4 | 7 | 8 | 9 | 5 | 6 | 7 | 8 |
| Perfluoroelastomer | FFKM 2 | 94 | 94 | 94 | 94 | 94 | 94 | 94 | 94 |
|  | FFKM 3 (elastomer component) | 6 | 6 | 6 | 6 | 6 | 6 | 6 | 6 |
| Fluororesin | Fluororesin 2 | 10 | 10 | 10 | 10 | 10 | 10 | 10 | 10 |
|  | Ketjen black |  | 0.5 | 2.5 | 5.0 | 5.5 | 6.0 | 7.5 | 10.0 |
|  | Triazine catalyst | 2 | 2 | 2 | 2 | 2 | 2 | 2 | 2 |
| Ozone resistance | Weight loss rate (%) | 0.66 | 0.44 | 0.48 | 0.61 | 0.65 | 0.67 | 0.68 | not moldable |
|  | Changes in surface state | A | A | A | A | A | A | A |  |
| Fluorine radical resistance | Weight loss rate (%) | 0.70 | 0.28 | 0.12 | 0.02 | 0.02 | 0.02 | 0.01 |  |
|  | Changes in surface state | C | A | A | A | A | A | A |  |
|  | Moldability | A | A | A | A | B | B | C | D |
| Crosslinking characteristics | $M_L$ [kgf · cm] | 4.21 | 4.01 | 5.67 | 8.55 |  |  |  |  |
|  | $M_H$ [kgf · cm] | 48.02 | 48.55 | 48.35 | 47.99 |  |  |  |  |
|  | tc(10) [min] | 3.67 | 4.15 | 6.35 | 9.21 |  |  |  |  |
|  | tc(50) [min] | 11.20 | 12.56 | 20.45 | 31.15 |  |  |  |  |
|  | tc(90) [min] | 7.53 | 8.41 | 14.10 | 21.94 |  |  |  |  | were then produced. First, in accordance with the blending composition shown in Table 3 (the unit of the blending amount is part(s) by weight in Table 3), the respective blending agents were kneaded in predetermined amounts by an open roll. Next, each of the obtained perfluoroelastomer compositions was press-molded in conditions described below, and then subjected to secondary crosslinking by heat in conditions described below to obtain a sealing material (O-ring). It should be noted that the perfluoroelastomer composition in Comparative Example 13 could not be press-molded.

Press molding conditions 180° C.×30 minutes; secondary crosslinking conditions 250° C.×24 hours.

[3] Evaluation of Moldability
Evaluation was made in the same manner as in Examples 1 to 6 and Comparative Examples 1 to 3.
[4] Evaluation of Crosslinking Characteristics of Perfluoroelastomer Composition
Evaluation was made in the same manner as in Examples 7 to 9 and Comparative Examples 4 to 8.

Comparative Examples 15 and 16

Perfluoroelastomer compositions were prepared in accordance with the following procedure, and sealing materials were then produced. First, in accordance with the blending composition shown in Table 4 (the unit of the blending amount is part(s) by weight in Table 4), the respective

TABLE 3

| | | Comparative Example | Example | | | | | | | Comparative Example | | | | |
|---|---|---|---|---|---|---|---|---|---|---|---|---|---|---|
| | | 9 | 10 | 11 | 12 | 13 | 14 | 15 | 16 | 10 | 11 | 12 | 13 | 14 |
| Perfluoroelastomer | FFKM 2 | 94 | 94 | 94 | 94 | 94 | 94 | 94 | 94 | 94 | 94 | 94 | 94 | 94 |
| | FFKM 3 (elastomer component) | 6 | 6 | 6 | 6 | 6 | 6 | 6 | 6 | 6 | 6 | 6 | 6 | 6 |
| Ketjen black | | | 0.1 | 0.5 | 2.0 | 3.0 | 4.0 | 4.5 | 5.0 | 5.5 | 6.0 | 7.5 | 10.0 | |
| SEAST GSO | | | | | | | | | | | | | | 0.5 |
| Triazine catalyst | | 2 | 2 | 2 | 2 | 2 | 2 | 2 | 2 | 2 | 2 | 2 | 2 | 2 |
| Ozone resistance | Weight loss rate (%) | 0.70 | 0.52 | 0.46 | 0.47 | 0.49 | 0.61 | 0.62 | 0.63 | 0.71 | 0.74 | 0.79 | not moldable | 0.65 |
| | Changes in surface state | A | A | A | A | A | A | A | A | A | A | A | | A |
| Fluorine radical resistance | Weight loss rate (%) | 0.84 | 0.49 | 0.34 | 0.19 | 0.12 | 0.10 | 0.05 | 0.03 | 0.02 | 0.02 | 0.02 | | 0.86 |
| | Changes in surface state | C | A | A | A | A | A | A | A | A | A | A | | C |
| Moldability | | A | A | A | A | A | A | A | A | B | B | C | D | A |
| Crosslinking characteristics | $M_L$ [kgf·cm] | 3.10 | 2.61 | 3.01 | 3.22 | 3.37 | 4.81 | 5.55 | 6.45 | 6.25 | 5.88 | 5.49 | 6.35 | |
| | $M_H$ [kgf·cm] | 42.98 | 44.05 | 45.84 | 46.87 | 47.94 | 45.91 | 44.65 | 43.81 | 39.61 | 35.11 | 27.07 | 18.13 | |
| | tc(10) [min] | 4.01 | 3.89 | 4.69 | 5.11 | 5.79 | 7.51 | 8.24 | 9.57 | 10.99 | 12.67 | 15.85 | 18.38 | |
| | tc(50) [min] | 9.80 | 9.65 | 12.87 | 14.33 | 16.29 | 25.55 | 29.45 | 34.92 | 38.11 | 41.44 | 48.29 | 51.07 | |
| | tc(90) [min] | 5.79 | 5.76 | 8.18 | 9.22 | 10.50 | 18.04 | 21.21 | 25.35 | 27.12 | 28.77 | 32.44 | 32.69 | |

The details of each blending agent used in Examples and Comparative Examples described above are as follows.

[1] FFKM 2: a perfluoroelastomer that is a tetrafluoroethylene-perfluoro(alkyl vinyl ether)-nitrile group-containing monomer copolymer ["PFE 191TZ" manufactured by 3M Company].

[2] FFKM 3: a composition containing a perfluoroelastomer that is a tetrafluoroethylene-perfluoro(alkyl vinyl ether)-nitrile group-containing monomer copolymer and a triazine catalyst ["PFE 01CZ" manufactured by 3M Company]. In Table 3, the content of the perfluoroelastomer (parts by weight) contained in FFKM 3 is shown in the column of "FFKM 3" and the content of the triazine catalyst (parts by weight) contained in FFKM 3 is shown in the column of "Triazine catalyst."

[3] Ketjen black: "KETJEN BLACK EC600JD" manufactured by LION SPECIALTY CHEMICALS CO., LTD.

[4] SEAST GSO: N-550 FEF carbon black "SEAST GSO" manufactured by TOKAI CARBON CO., LTD.

(Evaluation of Sealing Material)
The following items of the obtained crosslinked moldings (sealing materials) were measured and evaluated. The results are shown in Table 3.

[1] Evaluation of Ozone Resistance
Evaluation was made in the same manner as in Examples 1 to 6 and Comparative Examples 1 to 3.

[2] Evaluation of Fluorine Radical Resistance
Evaluation was made in the same manner as in Examples 1 to 6 and Comparative Examples 1 to 3.

blending agents were kneaded in predetermined amounts by an open roll. Next, each of the obtained perfluoroelastomer compositions was press-molded in conditions described below, and then subjected to secondary crosslinking by heat in conditions described below to obtain a sealing material (O-ring).

Press molding conditions 170° C.×20 minutes; secondary crosslinking conditions 200° C.×12 hours.

TABLE 4

| | | Comparative Example | |
|---|---|---|---|
| | | 15 | 16 |
| Perfluoroelastomer | FFKM 4 | 100 | 100 |
| Fluororesin | Fluororesin 2 | 10 | 10 |
| Ketjen black | | | 0.5 |
| Co-crosslinking agent | | 3 | 3 |
| Organic peroxide | | 1 | 1 |
| Ozone resistance | Weight loss rate (%) | 0.52 | 0.50 |
| | Changes in surface state | C | C |
| Fluorine radical resistance | Weight loss rate (%) | 0.56 | 0.58 |
| | Changes in surface state | B | B |
| Moldability | | A | A |

The details of each blending agent used in Comparative Examples described above are as follows.

[1] FFKM 4: a perfluoroelastomer that is a tetrafluoroethylene-perfluoro(alkyl vinyl ether)-halogen atom-containing monomer copolymer ["PFE 90Z" manufactured by 3M Company].

[2] Fluororesin 2: fluororesin powder "Lubron L-5" manufactured by Daikin Industries, Ltd.

[3] Ketjen black: "KETJEN BLACK EC600JD" manufactured by LION SPECIALTY CHEMICALS CO., LTD.

[4] Co-crosslinking agent: triallyl isocyanurate "TAIC WH-60" manufactured by Nihon Kasei CO., LTD.

[5] Organic peroxide: a peroxide "PERHEXA 25B-40" (chemical name: 2,5-dimethyl-2,5-di(t-butylperoxy)hexane) manufactured by NOF CORPORATION.

(Evaluation of Sealing Material)

The following items of the crosslinked molded products (sealing materials) obtained were measured and evaluated. The results are shown in Table 4.

[1] Evaluation of Ozone Resistance

Evaluation was made in the same manner as in Examples 1 to 6 and Comparative Examples 1 to 3.

[2] Evaluation of Fluorine Radical Resistance

Evaluation was made in the same manner as in Examples 1 to 6 and Comparative Examples 1 to 3.

[3] Evaluation of Moldability

Evaluation was made in the same manner as in Examples 1 to 6 and Comparative Examples 1 to 3.

The invention claimed is:

1. A perfluoroelastomer composition, comprising 100 parts by weight of perfluoroelastomer containing a constituent unit derived from a nitrile group-containing monomer, 0.1 to less than 1 parts by weight of ketjen black, and an oxazole crosslinking agent.

2. A sealing material, comprising a crosslinked product of the perfluoroelastomer composition according to claim 1.

* * * * *